(12) United States Patent
Gati et al.

(10) Patent No.: US 11,418,395 B2
(45) Date of Patent: Aug. 16, 2022

(54) SYSTEMS AND METHODS FOR AN ENHANCED FRAMEWORK FOR A DISTRIBUTED COMPUTING SYSTEM

(71) Applicant: ServiceNow, Inc., Santa Clara, CA (US)

(72) Inventors: Ofer Gati, Netanya (IL); Yuval Rimar, Petah Tikva (IL); Olga Shaked, Petah Tiqwa (IL); Tal Kapon, Givataim (IL); Haviv Rosh, Modiin (IL); Neta Hasdai-Rippa, Tel Aviv (IL)

(73) Assignee: ServiceNow, Inc., Santa Clara, CA (US)

( * ) Notice: Subject to any disclaimer, the term of this patent is extended or adjusted under 35 U.S.C. 154(b) by 41 days.

(21) Appl. No.: 16/737,627

(22) Filed: Jan. 8, 2020

(65) Prior Publication Data
US 2021/0211356 A1  Jul. 8, 2021

(51) Int. Cl.
*G06F 15/177* (2006.01)
*H04L 41/0853* (2022.01)
*H04L 67/10* (2022.01)
*H04L 43/08* (2022.01)
*H04L 41/0893* (2022.01)

(52) U.S. Cl.
CPC ...... *H04L 41/0856* (2013.01); *H04L 41/0893* (2013.01); *H04L 43/08* (2013.01); *H04L 67/10* (2013.01)

(58) Field of Classification Search
CPC . H04L 41/0856; H04L 41/0893; H04L 43/08; H04L 67/10; H04L 41/04; H04L 41/046; H04L 41/082; H04L 41/085; H04L 41/12; H04L 43/00; H04L 43/0817; H04L 43/10; H04L 67/125; H04L 67/2838; H04L 12/2818; G06F 16/958
USPC ................................ 709/220, 221, 223, 224
See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 6,799,189 B2 | 9/2004 | Huxoll |
| 6,816,898 B1 | 11/2004 | Scarpelli |
| 6,895,586 B1 | 5/2005 | Brasher |
| 6,904,449 B1 * | 6/2005 | Quinones ............... G06Q 10/10 709/203 |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |

(Continued)

*Primary Examiner* — Thu Ha T Nguyen
(74) *Attorney, Agent, or Firm* — Fletcher Yoder PC

(57) ABSTRACT

Systems and methods may include a managerial server, such as an intermediary measurement, instrumentation, and discovery (MID) server, communicatively coupled to an instance hosted by a cloud service platform. The managerial server is also coupled to an agent. The managerial server is configured to receive a first result from a first check executed by the agent having a first check type and to transmit the first result to the instance using a connection type generic to multiple check types including the first check type. The managerial server is also configured to receive a second result from a second check executed by the agent having a second check type and to transmit the second result using a dedicated pipeline for the second check type.

20 Claims, 12 Drawing Sheets

(56) References Cited

U.S. PATENT DOCUMENTS

| | | | |
|---|---|---|---|
| 7,131,037 B1 | 10/2006 | LeFaive | |
| 7,170,864 B2 | 1/2007 | Matharu | |
| 7,213,065 B2* | 5/2007 | Watt | G06F 9/4401 709/220 |
| 7,328,260 B1* | 2/2008 | Muthiyan | H04L 41/0681 711/170 |
| 7,350,209 B2 | 3/2008 | Shum | |
| 7,392,300 B2 | 6/2008 | Anantharangachar | |
| 7,506,040 B1* | 3/2009 | Rabe | H04L 67/1097 711/170 |
| 7,610,512 B2 | 10/2009 | Gerber | |
| 7,617,073 B2 | 11/2009 | Trinon | |
| 7,685,167 B2 | 3/2010 | Mueller | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,890,802 B2 | 2/2011 | Gerber | |
| 7,895,317 B2* | 2/2011 | Gingell, Jr | G06F 9/5055 709/224 |
| 7,925,981 B2 | 4/2011 | Pourheidar | |
| 7,930,396 B2 | 4/2011 | Trinon | |
| 7,933,927 B2 | 4/2011 | Dee | |
| 7,945,860 B2 | 5/2011 | Vambenepene | |
| 7,966,398 B2 | 6/2011 | Wiles | |
| 8,051,164 B2 | 11/2011 | Peuter | |
| 8,082,222 B2 | 12/2011 | Rangarajan | |
| 8,151,261 B2 | 4/2012 | Sirota | |
| 8,224,683 B2 | 7/2012 | Manos | |
| 8,266,096 B2 | 9/2012 | Navarrete | |
| 8,380,645 B2 | 2/2013 | Kowalski | |
| 8,402,127 B2 | 3/2013 | Solin | |
| 8,423,637 B2* | 4/2013 | Vaswani | H04L 43/0817 709/224 |
| 8,457,928 B2 | 6/2013 | Dang | |
| 8,478,569 B2 | 7/2013 | Scarpelli | |
| 8,554,750 B2 | 10/2013 | Rangaranjan | |
| 8,612,408 B2 | 12/2013 | Trinon | |
| 8,646,093 B2 | 2/2014 | Myers | |
| 8,674,992 B2 | 3/2014 | Poston | |
| 8,743,121 B2 | 6/2014 | De Peuter | |
| 8,745,040 B2 | 6/2014 | Kowalski | |
| 8,812,539 B2 | 8/2014 | Milousheff | |
| 8,818,994 B2 | 8/2014 | Kowalski | |
| 8,819,204 B2* | 8/2014 | Herzog | H04M 15/57 709/223 |
| 8,832,652 B2 | 9/2014 | Mueller | |
| 8,887,133 B2 | 11/2014 | Behnia | |
| 8,892,725 B2* | 11/2014 | Wang | H04L 63/1458 709/224 |
| 9,015,188 B2 | 4/2015 | Behne | |
| 9,021,077 B2* | 4/2015 | Nagai | G06F 11/0709 709/223 |
| 9,037,536 B2 | 5/2015 | Vos | |
| 9,065,783 B2 | 6/2015 | Ding | |
| 9,098,322 B2 | 8/2015 | Apte | |
| 9,122,552 B2 | 9/2015 | Whitney | |
| 9,137,115 B2 | 9/2015 | Mayfield | |
| 9,239,857 B2 | 1/2016 | Trinon | |
| 9,317,327 B2 | 4/2016 | Apte | |
| 9,323,801 B2 | 4/2016 | Morozov | |
| 9,363,252 B2 | 6/2016 | Mueeler | |
| 9,412,084 B2 | 9/2016 | Kowalski | |
| 9,467,344 B2 | 10/2016 | Gere | |
| 9,535,737 B2 | 1/2017 | Joy | |
| 9,557,969 B2 | 1/2017 | Sharma | |
| 9,613,070 B2 | 4/2017 | Kumar | |
| 9,645,833 B2 | 5/2017 | Mueller | |
| 9,654,473 B2 | 5/2017 | Miller | |
| 9,659,051 B2 | 5/2017 | Hutchins | |
| 9,766,935 B2 | 9/2017 | Kelkar | |
| 9,792,387 B2 | 10/2017 | George | |
| 9,805,322 B2 | 10/2017 | Kelkar | |
| 9,852,165 B2 | 12/2017 | Morozov | |
| 10,002,203 B2 | 6/2018 | George | |
| 10,313,204 B1* | 6/2019 | Sullivan | H04L 41/22 |
| 2002/0143917 A1 | 10/2002 | Stevenson | H04Q 3/0075 709/223 |
| 2002/0161875 A1* | 10/2002 | Raymond | H04L 41/22 709/223 |
| 2002/0174207 A1* | 11/2002 | Battou | H04L 41/0856 709/223 |
| 2003/0028624 A1* | 2/2003 | Hasan | H04L 41/0856 709/220 |
| 2003/0074433 A1* | 4/2003 | Soemo | H04L 67/2823 709/223 |
| 2003/0074580 A1* | 4/2003 | Knouse | H04L 67/142 726/4 |
| 2003/0200297 A1* | 10/2003 | Wiener | H04L 41/0843 709/223 |
| 2004/0019889 A1* | 1/2004 | Melchione | G06F 8/61 717/172 |
| 2004/0199576 A1* | 10/2004 | Tan | H04L 29/12207 709/203 |
| 2005/0091355 A1* | 4/2005 | Keohane | H04L 63/0428 709/223 |
| 2006/0036720 A1* | 2/2006 | Faulk | H04L 63/1458 709/223 |
| 2007/0208837 A1* | 9/2007 | Tian | G06F 3/1226 709/223 |
| 2007/0233831 A1* | 10/2007 | Tremblay | H04L 67/125 709/223 |
| 2007/0266138 A1* | 11/2007 | Spire | H04L 63/1416 709/223 |
| 2007/0283005 A1* | 12/2007 | Beliles | H04L 41/0816 709/224 |
| 2008/0021984 A1* | 1/2008 | Zarenin | G06F 11/3093 709/220 |
| 2008/0046552 A1* | 2/2008 | Watson | H04L 43/0817 709/223 |
| 2008/0049779 A1* | 2/2008 | Hopmann | H04L 12/2807 370/431 |
| 2008/0052384 A1* | 2/2008 | Marl | H04L 41/0273 709/223 |
| 2008/0126406 A1* | 5/2008 | Endabetla | G06Q 10/06 |
| 2008/0178212 A1* | 7/2008 | Kinoshita | H04N 21/6582 725/32 |
| 2010/0094981 A1* | 4/2010 | Cordray | H04L 41/0806 709/224 |
| 2010/0100778 A1* | 4/2010 | Sullivan | H04L 67/00 714/57 |
| 2010/0262467 A1* | 10/2010 | Barnhill, Jr | H04L 41/12 709/223 |
| 2010/0318639 A1* | 12/2010 | Jauquet | G06F 9/485 709/223 |
| 2011/0035491 A1* | 2/2011 | Gelvin | G06F 15/173 709/224 |
| 2011/0131654 A1* | 6/2011 | Taneja | H04L 63/1441 726/23 |
| 2012/0047249 A1* | 2/2012 | Bharadwaj | H04L 49/555 709/224 |
| 2012/0110153 A1* | 5/2012 | Atkins | G06F 9/542 709/223 |
| 2012/0278477 A1* | 11/2012 | Terrell | H04L 41/5009 709/224 |
| 2012/0324094 A1* | 12/2012 | Wyatt | H04L 43/0876 709/224 |
| 2013/0160070 A1* | 6/2013 | Ladd | H04L 43/0876 725/129 |
| 2013/0166703 A1* | 6/2013 | Hammer | H04L 63/10 709/220 |
| 2013/0276053 A1* | 10/2013 | Hugard, IV | H04L 63/104 726/1 |
| 2013/0304902 A1* | 11/2013 | Demmer | H04L 67/22 709/224 |
| 2014/0173087 A1* | 6/2014 | Varney | G06F 9/5055 709/224 |
| 2014/0270157 A1* | 9/2014 | Youd | G06F 16/21 380/44 |

(56) References Cited

U.S. PATENT DOCUMENTS

| | | | | |
|---|---|---|---|---|
| 2014/0280829 | A1* | 9/2014 | Kjendal | H04L 43/028 709/223 |
| 2014/0310392 | A1* | 10/2014 | Ho | H04L 67/02 709/223 |
| 2014/0337496 | A1* | 11/2014 | Ramachandran | H04L 41/24 709/223 |
| 2014/0344452 | A1* | 11/2014 | Lipstone | H04L 41/50 709/224 |
| 2014/0344453 | A1* | 11/2014 | Varney | H04L 65/4084 709/224 |
| 2015/0089055 | A1* | 3/2015 | Sullivan | H04L 43/04 709/224 |
| 2015/0188992 | A1* | 7/2015 | Ayanam | H04L 67/16 709/203 |
| 2016/0315982 | A1* | 10/2016 | Wallace | H04L 41/0853 |
| 2017/0251026 | A1* | 8/2017 | Straub | H04L 67/02 |
| 2017/0286708 | A1* | 10/2017 | Erhart | G06F 21/6218 |
| 2018/0123935 | A1* | 5/2018 | Ezer | H04L 41/046 |
| 2018/0123940 | A1* | 5/2018 | Rimar | H04L 45/02 |
| 2019/0075017 | A1* | 3/2019 | Laden | H04L 67/10 |
| 2019/0319868 | A1* | 10/2019 | Svennebring | H04L 41/147 |
| 2021/0007023 | A1* | 1/2021 | Umapathy | H04W 36/0083 |
| 2021/0084451 | A1* | 3/2021 | Williams | G16H 40/63 |
| 2021/0211356 | A1* | 7/2021 | Gati | H04L 41/0856 |
| 2021/0360034 | A1* | 11/2021 | Olden | H04L 63/1408 |

* cited by examiner

| | NAME | IP ADDRESS | CMDB CI | MID | STATUS | UP SINCE | UPDATED |
|---|---|---|---|---|---|---|---|
| | SEARCH | SEARCH | SEARCH | SEARCH | SEARCH | SEARCH | SEARCH |
| ☐ | nowagentts1 | 10.1.4.4 | nowagentts1 | aws-mid-2 | • ALIVE | 2019-11-04 22:59:58 | 2019-11-06 07:06:49 |
| ☐ | 10-196-39-94-centos | 10.196.39.94 | 10-196-39-94-centos | aws-mid-2 | • ALIVE | 2019-11-04 22:59:58 | 2019-11-06 07:06:49 |
| ☐ | V-W2K8-DMT-Vitaly-MID | 10.196.39.218 | V-W2K8-DMT-Vitaly-MID | aws-mid-2 | • ALIVE | 2019-11-04 22:59:58 | 2019-11-06 07:06:49 |
| ☐ | V-Windows10-TalK | 10.196.39.31 | V-Windows10-TalK | aws-mid-2 | • ALIVE | 2019-11-04 22:59:58 | 2019-11-06 07:06:49 |
| ☐ | V-Ubunto-TalK | 10.196.33.23 | v-ubunto-talk | aws-mid-2 | • ALIVE | 2019-11-04 22:59:58 | 2019-11-06 07:06:49 |
| ☐ | ip-172-30-3-38 | 172.30.3.38 | ip-172-30-3-38 | aws-mid-2 | • ALIVE | 2019-11-04 22:59:58 | 2019-11-06 07:06:49 |
| ☐ | V-W2K8-33DIW-MI | 10.196.33.59 | v-w2k8-33diw-mi | aws-mid-2 | ○ DOWN | 2019-09-01 02:26:29 | 2019-09-01 22:24:07 |
| ☐ | tokyo3322 | 10.218.64.57 | tokyo3322 | aws-mid-2 | ○ DOWN | 2019-09-01 23:50:03 | 2019-09-02 21:54:50 |
| ☐ | nairobi4602 | 10.218.64.57 | nairobi4602 | | | | |

FIG. 9

SYSTEMS AND METHODS FOR AN ENHANCED FRAMEWORK FOR A DISTRIBUTED COMPUTING SYSTEM

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Computer resources hosted in distributed computing (e.g., cloud-computing) environments may be disparately located with different resources potentially having their own functions, properties, and/or permissions. Such resources may include hardware resources (e.g. computing devices, switches, etc.) and software resources (e.g. database applications). These resources may be used to collect and store data at various times related to a variety of measurable properties, including network, hardware, or database performance properties measured at different times. Resources may often be removed and added to a network. As such, network management may require an enhanced framework that may extend a monitoring solution that supports a dynamic and changing environment of resources to include additional functionality, such as discovery or security functionality.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Information Technology (IT) networks may include a number of computing devices, server systems, databases, and the like that generate, collect, store, and distribute information. With this in mind, an IT system may include service mapping logic that generates an accurate, service-aware view (e.g., a "service mapping") of the system infrastructure that is frequently refreshed, keeping the view up to date. The service mapping may be constructed by automatically discovering and mapping relationships between IT components running specific services. The service mapping logic may monitor the IT infrastructure for service-affecting changes and update the service mapping in real-time. The service mapping may provide a mix of applications and IT components that support a service and provide an understanding of how these applications and components are related.

The disclosed techniques enable a user to better maintain and manage a dynamic network of components using a generic framework to handle various types of checks. For instance, in some embodiments, a user may define any type of data and associate the type of data with a specific command that will be executed by an agent and the definition also defines how to hand results from the command in an instance or a MID server. For example, in some embodiments, the disclosed techniques enable a user to perform checks (e.g., discovery, metrics, security, or event management) on various configuration items (CIs) (e.g., devices, applications, containers, microservices, or ephemeral entities) on devices employed within a distributed system that may often be subject to change. For example, CIs may frequently be added, updated, or removed from the distributed system infrastructure. The disclosed techniques provide a multipartite paradigm that facilitates communication between an agent installed on a device associated with one or more CIs, a management or administrative server (e.g., a management, instrumentation, and discovery (MID) server), and the instance to efficiently monitor data associated with each CI in the distributed system. In some embodiments, the multipartite paradigm may include more than one agent. Regardless of the number of agents, the agents may include lightweight clients that run on the infrastructure component CIs. For example, the agent may include a $3^{rd}$ party agent. The agent collects data (CIs, events, metrics, etc.) about the infrastructure and the installed applications and is reported to an instance.

For example, an agent may be installed on each device in a network that has multiple devices, and each agent may communicate with a MID server and the instance (e.g., an instance of a configuration management service). As such, the multipartite paradigm may provide an efficient and scalable monitoring framework that facilitates discovery, event management, metrics collection, and/or other functions with multiple CIs in the distributed system. The data shared between the agent, the MID server, and the configuration management service within the multipartite paradigm may enable the components to operate more efficiently and generally provide for improved monitoring of the distributed system infrastructure. For example, the multipartite paradigm may provide a user with real-time (or substantially real-time) data associated with a CI in response to a query of the CI by the user via the instance.

Additionally, the agent may minimize the need to bind a CI to data produced as a result of a check performed by the agent on the CI. After installation of the agent on a device associated with a CI, the agent may register an occurrence of the agent with the MID server, which, in turn, may register the occurrence of the agent with the instance. Thereafter, the agent may send a CI identifier with any data the agent has collected from a check associated with the CI to the MID server. The MID server may also transmit the received data with the CI identifier to the instance that may store the information in a configuration management database. As such, the MID server and/or the instance may automatically determine that a connected agent has no CI entries in the CMDB and may initiate discovery of any CIs (e.g., the device on which the agent is installed) to be associated with the connected agent using a generic framework that may be used for various checks using the framework.

After the agent has registered an occurrence of the agent with the MID server and the instance, the agent may perform one or more checks associated with the CI. In some embodiments, the MID server may send a check request to the agent to perform a check command on the CI from the MID server or the instance. For example, after determining that a received check request corresponds to the performance of a discovery process, the agent may perform the discovery process associated with the corresponding CI to determine one or more attributes of the CI, such as a name of the CI or a CI identifier, an internet protocol (IP) address associated with the CI, a serial number associated with the CI, a time stamp associated with the check (e.g., discovery process) performed on the CI, or the like, and identify any executing processes on the CI. The agent may then send a discovery payload (e.g., data collected as a result of the discovery process) to the MID server. The MID server may pass the discovery payload to the instance through a generic connection. The instance may then store the data in the database. Similar processes may be used for other types of check commands, such as tests, operating system (OS) queries, and the like.

When the check command includes types of data to be processed at the MID server (e.g., metrics or events), the MID server may process the data and/or pass the data to appropriate handlers via the MID server that passes processed and/or unprocessed data through appropriate pipelines. When the check command includes types of data to be processed at the instance, the MID server may transmit to the instance some data that is first processed in the MID server and/or data that is unchanged in the MID server.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 9 is a user interface illustrating an agent page presenting information about agents that may be used in the flow architecture of FIG. 5, in accordance with aspects of the present disclosure;

DETAILED DESCRIPTION OF SPECIFIC EMBODIMENTS

Figure 1:
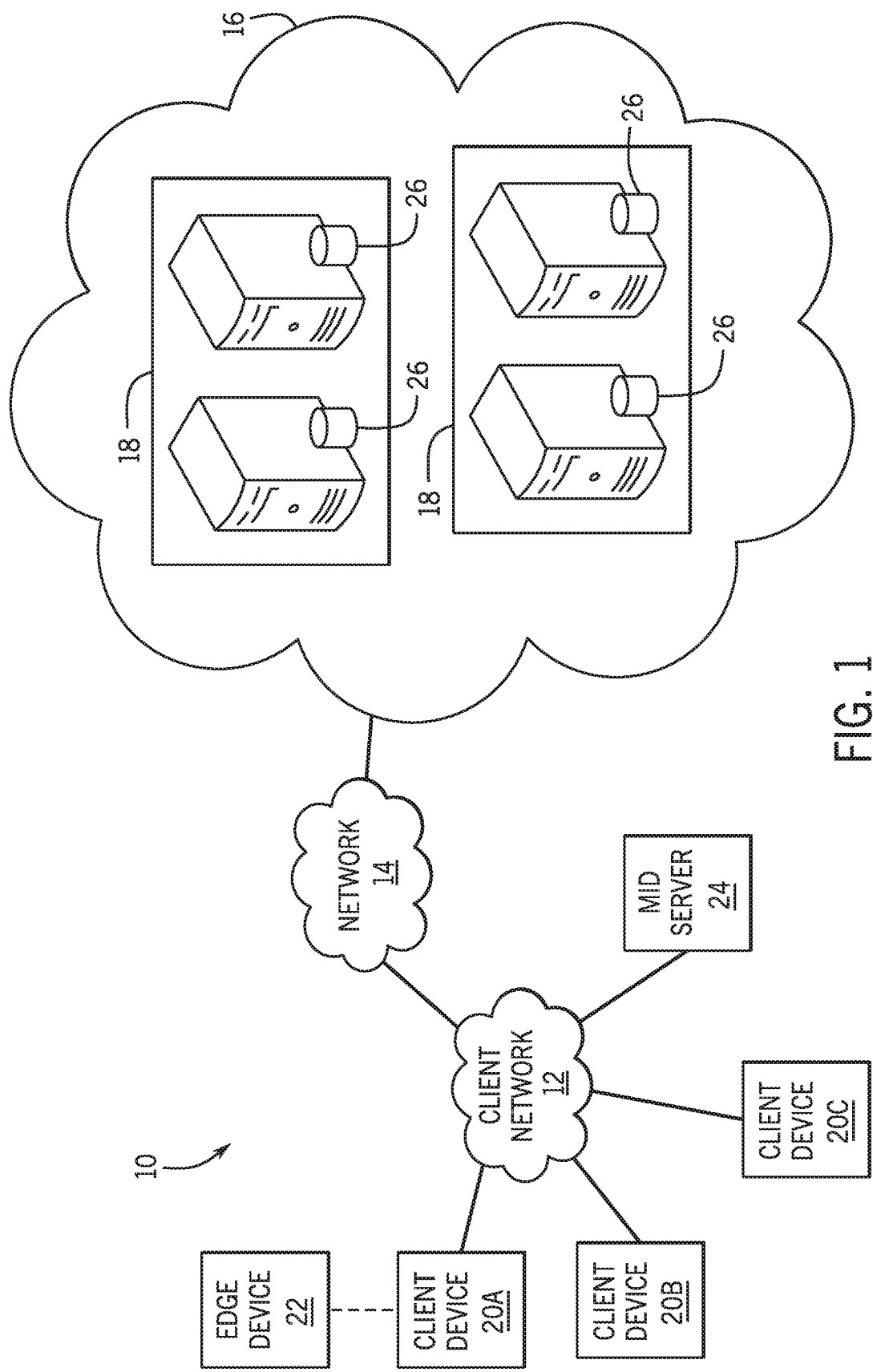
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device. Additionally or alternatively, the computing system may refer to any number of (e.g., multiple) of the foregoing electronic computing devices working together to perform the function described as being performed on or by the computing system. As used herein, the term "medium" refers to one or more non-transitory, computer-readable tangible media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application may include software modules, software objects, software instances, and/or other types of executable code. As used herein, the term "configuration item" or "CI" refers to a record for any component (e.g., computer, processor, memory, storage device, network device, power supply, piece of software, license, enterprise service, database table, script, webpage, piece of metadata, virtual resources, storage constructs, and so forth) in an enterprise network, for which relevant data, such as manufacturer, vendor, location, or similar data, is stored in a configuration management database (CMDB). As such, CIs may refer to physical resources and/or virtual resources. The CMDB may include an index of CIs, attributes (e.g., roles, characteristics of elements, etc.) associated with the CIs, and/or relationships between the CIs. Furthermore, the CMDB may track configuration files that relate to each CI.

Information Technology (IT) devices are increasingly important in an electronics-driven world in which various electronic devices are interconnected within a distributed context. As more and more functions are performed by services using some form of distributed computing, the complexity of IT network management increases. As these devices are separated geospatially, managing and tracking the configuration of these devices may become more difficult.

In such an interconnected but distributed context, the configuration of each of these devices may be represented by configuration items (CIs) that detail certain configurations, parameters, components, software, or settings associated with a respective device. CIs may include information related to a physical entity (e.g., hardware), a logical entity (e.g., a version or an instance of a database), a conceptual entity (e.g., a service or license), and the like, associated with a respective device. Given the wide variety of CIs associated with various devices within this type of complex IT environment, configuration item (CI) discovery executed on a given infrastructure is used to track the CIs of the devices that are present on the connected IT environment. That is, CI discovery is the process of finding configuration items, such as hardware, software, documentation, location, and other information related to the devices connected to a given network, such as an enterprise's network. This discovery process may be performed at least partially using automated routines, e.g., an application program or probe, running on the network in question. When a CI is identified by such routines, discovery includes exploring some or all of the CI's configuration, provisioning, and current status. This explored information may be used to update one or more databases, such as a configuration management database (CMDB), accordingly.

The CMDB stores and tracks all of the discovered devices connected to the network as well as any status information determined by the respective probe(s). Each of these devices may have one or more corresponding configuration files that control how the asset functions. These configuration files may facilitate discovery of corresponding devices. On computer systems, the discovery process may also identify software applications running on the discovered devices, and any connections, such as Transmission Control Protocol (TCP) connections between computer systems. Discovery may also be used to track all the relationships between computer systems, such as an application program running on one server that utilizes a database stored on another server. CI discovery may be performed at initial installation or instantiation of connections of new devices, and/or CI discovery may be scheduled to occur periodically to track additions, removals, or changes to the IT devices being managed, thereby keeping data stored on the CMDB current. Thus, using the discovery process, an up-to-date map of devices and their infrastructural relationships may be maintained.

The disclosed techniques may enable a user to better maintain and manage a dynamic network of components. Specifically, the disclosed techniques enable a user to perform checks (e.g., discovery, metrics, or event management) on various configuration items (CIs) (e.g., devices, applications, containers, microservices, or ephemeral entities) on devices employed within a distributed system that may often be subject to change. For example, CIs may frequently be added, updated, or removed from the distributed system infrastructure. The disclosed techniques provide a multipartite paradigm that facilitates communication between an agent installed on a device associated with one or more CIs, a management or administrative server (e.g., a management, instrumentation, and discovery (MID) server), and a configuration management service to efficiently monitor data associated with each CI in the distributed system. The agent may be a small client which contains multiple plugins (e.g., OS, memory, CPU, Apache, Tomcat, Internet Information Services (IIS), MySQL, and the like). The agent provides dynamic self-registration and a self-check execution scheduler. The MID server may include a Web Socket with a transport layer to which the agent connects. The MID server then uses existing pipelines per each agent to pass information between the instance and the agent.

In some embodiments, the multipartite paradigm may include more than one agent. For example, an agent may be installed on each device in a network that has multiple devices, and each agent may communicate with a MID server and a configuration management service.

As such, the multipartite paradigm may provide an efficient and scalable monitoring framework that facilitates discovery, event management, and metrics collection with multiple CIs in the distributed system. The data shared between the agent, the MID server, and the configuration management service within the multipartite paradigm may enable the components to operate more efficiently and generally provide for improved monitoring of the distributed system infrastructure. For example, the multipartite paradigm may provide a user with real-time (or substantially real-time) data associated with a CI in response to a query of the CI by the user via the configuration management service.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a platform 16 that is cloud-based. In some implementations, the platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an intermediary administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes multiple virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances (e.g., virtual server 26A) handles requests from and serves multiple customers. Data centers 18 with multi-tenant cloud architecture commingle and store data from multiple customers, where multiple customer instances are assigned to one of the virtual servers 26. In a multi-tenant cloud architecture, the respective virtual server 26 distinguishes between and segregates data and other information of the various customers. For example, a multi-tenant cloud architecture could assign a respective identifier for each customer in order to identify and segregate the data from each customer. Generally, implementing a multi-tenant cloud architecture may suffer from various drawbacks, such as a failure of a respective one of the server instances causing outages for all customers allocated to the respective server instance.

In another embodiment, one or more of the data centers 18 are configured using a multi-instance cloud architecture to provide customers unique respective customer instances. For example, a multi-instance cloud architecture could provide customer instances with their own dedicated application servers and dedicated database servers. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
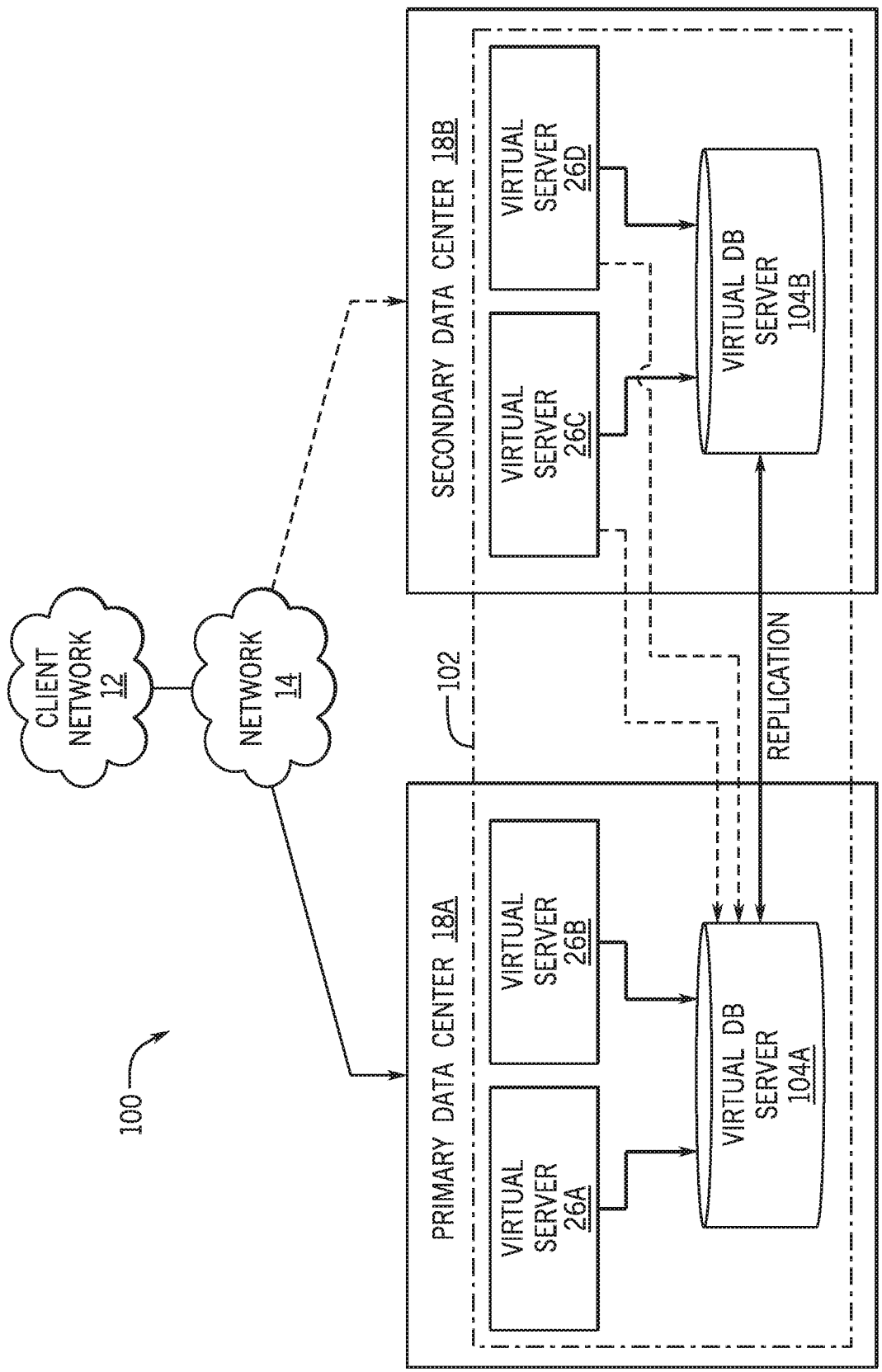
FIG. 2 is a schematic of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 14 that connect to two (e.g., paired) data centers 22A and 22B that may be geographically separated from one another. Using FIG. 2 as an example, network environment and service provider cloud infrastructure client instance 42 (also referred to herein as a client instance 42) is associated with (e.g., supported and enabled by) dedicated virtual servers (e.g., virtual servers 26A, 26B, 26C, and 26D) and dedicated database servers (e.g., virtual database servers 44A and 44B). Stated another way, the virtual servers 24A-24D and virtual database servers 44A and 44B are not shared with other client instances and are specific to the respective client instance 42. In the depicted example, to facilitate availability of the client instance 42, the virtual servers 24A-24D and virtual database servers 44A and 44B are allocated to two different data centers 22A and 22B so that one of the data centers 18 acts as a backup data center. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

Although FIGS. 1 and 2 illustrate specific embodiments of a cloud computing system 10 and the system 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

As mentioned above, an agent may be installed on a device associated with one or more CIs, which, when executed on the device, may perform a self-registration process (e.g., register an occurrence of the agent) with the MID server 24. Registration of the agent may generate a record of an agent in a data store of the MID server 24. For example, the data store may include multiple records of agents that have executed on a device in the system 100. Additionally, the MID server 24 may also update a CMDB with a record of the agent. As such, the MID server 24 and the CMDB may maintain an accurate, up-to-date data store of all agents that have been active in the system 100.

The agent may also perform one or more checks (e.g., discovery, metrics, or event management) on the device installed with the agent and send data collected from the check to the MID server 24. For example, the agent may send CI identification data (e.g., a CI identifier), attributes associated with a CI (e.g., an IP address, a serial number, or a time stamp associated with the check), any executing processes on the device, or the like, to the CMDB. The CMDB may then index the information received from the agent in CI records associated with corresponding CIs in the system. Additional details with regard to the agent is discussed below with regard to FIGS. 4-8.

Figure 3:
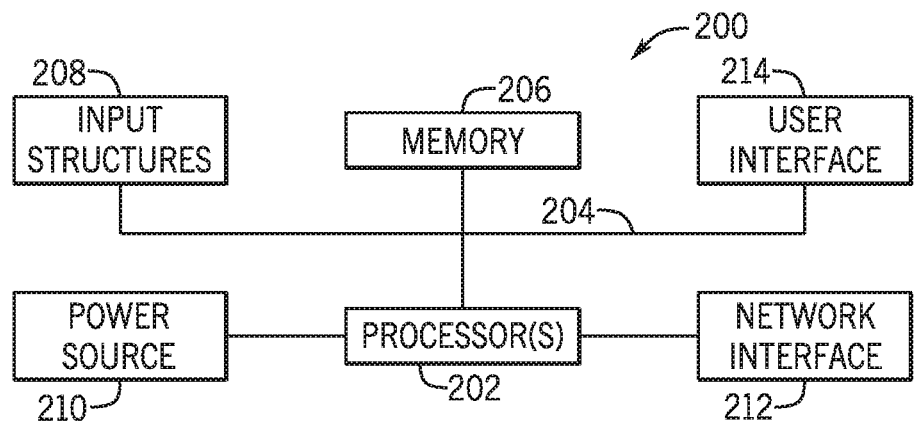
FIG. 3 is a block diagram of a computing device utilized in a computing system that may be present in the cloud architectures of FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing system 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
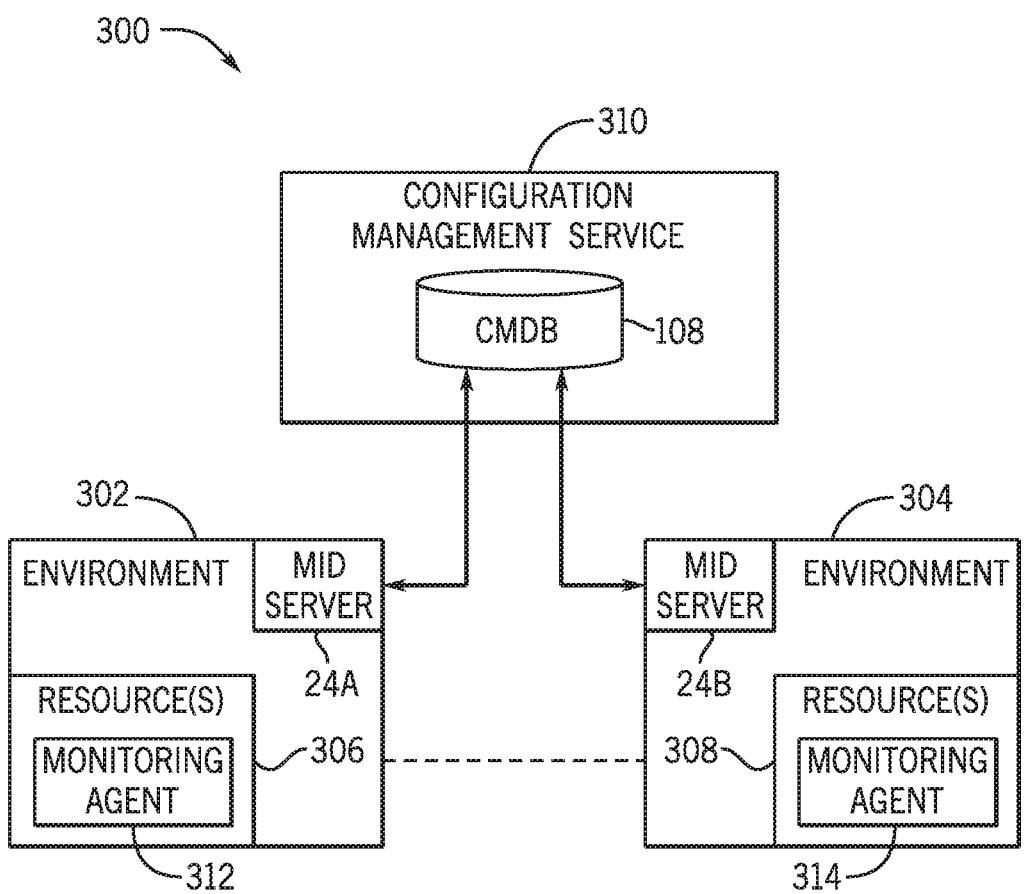
FIG. 4 is a block diagram of a distributed computing system that may be present in the cloud architectures of FIG. 1 or 2, in accordance with aspects of the present disclosure.

With this background discussion in mind, FIG. 4 is a block diagram of an embodiment of a distributed computing system 300 for discovering and/or managing connected configuration items (CIs). The distributed computing system 300 includes one or more environments such as environments 302 and 304 each including resources 306 and 308, respectively. Each environment 302, 304 may include one or more networks coupling resources together in a location-based, function-based, and/or common credentials-based grouping.

For example, the environments 302, 304 may include a customer service environment used to represent customer service infrastructure in a technical support, sales, billing, and/or other groupings. Similarly, the environments 302, 304 may include a datacenter and all devices coupled to one or more networks located at the datacenter. Additionally or alternatively, environment 302, 304 may be distributed across multiple geographical locations. Thus, the environment 302, 304 may include any devices that are accessible by a user account including resources 306, 308 that may be spatially distant from each other. In some embodiments, resources 306, 308 of the environments 302, 304 may communicate with each other across environments. However, in some embodiments aspects of the various environments may be provided by different vendors without communication there between. In such embodiments, the resources of disparate environments may communicate using the platform 16 (e.g., a configuration management service 310 that is a part of the platform 16 including the CMDB 108). The resources 306 and 308 may include any suitable configuration item (CI) previously discussed.

As discussed above, an agent 312, 314 may be installed on each resource 306, 308 (e.g., device) in the environment 302, 304. Additionally or alternatively, the agent 312, 314 may be installed on the MID server 24. After the agent 312, 314 is installed on a resource 306, 308, the agent 312, 314 may perform one or more tasks. For example, the agent 312, 314 may automatically register an occurrence of the agent 312, 314 with a MID server 24A, 24B. The MID server 24A, 24B may store the registered occurrence of the agent 312, 314 in a memory (e.g., data store) accessible to the MID server 24A, 24B. Thereafter, a communications protocol, such as a WebSocket protocol, may be associated with the agent 312, 314, the MID server 24A, 24B, and a configuration management service 310. In some embodiments, more than one communications protocol may be associated with the MID server 24A, 24B and the configuration management service 310. For example, multiple agents 312, 314 may automatically register respective occurrences of the agents 312, 314 with the MID server 24A, 24B. In such embodiments, the MID server 24A, 24B may communicate with each agent 312, 314 through a separate communications protocol (e.g., a WebSockets protocol).

The configuration management service 310 may include one or more servers providing access to and managing the CMDB 108. The configuration management service 310 may allocate or provision resources, such as application instances in the resources 306, 308 from a respective environment 302, 304. Further, the configuration management service 310 may create, modify, or remove information in the CMDB 108 relating to the resources 306, 308. For example, the configuration management service 310 may store data associated with a CI from an agent 312, 314 via a corresponding MID server 24A, 24B in one or more CI records. Thus, the configuration management service 310 may manage a catalogue of resources in more than a single environment (even if the environments do not directly communicate with each other). Using this catalogue, the configuration management service 310 may discover new resources, provision resources, allocate resources, modify, and/or remove resources form the catalogue across a single environment or multiple environments. In some embodiments, these actions may be initiated as part of an operation executed on a client 102, may be scheduled for periodic occasions (e.g., periodic discovery), or may be a combination thereof. For example, a client 102 may receive a request, via its input structures, to query an identity of an application program interface (API) used by a resource to access a particular vendor or provider for the environment 302 that is passed to the configuration management service 310 to query the CMDB 108. As another example, the client 102 may receive a request, via its input structures, to query an identity of a user authorized to access a particular resource that is passed to the configuration management service 310.

The CMDB 108 may be populated utilizing a discovery process performed by the agent 312, 314. The discovery process may include determining one or more properties or attributes of various CIs associated with a resource 306, 308 using the agent 312, 314. The agent 312, 314 may send a discovery payload (e.g., one or more properties or attributes of various CIs) to the MID server 24A, 24B, which may then send the discovery payload to the CMDB 108. The CMDB 108 may then store the data associated with the discovery payload in corresponding CI records.

In the illustrated embodiment, each environment 302, 304 has its own respective MID sever 24A, 24B. In some embodiments, a single MID server may be employed when the MID server may reach into multiple environments. For example, if the MID server is run in the platform 16 (e.g., in the configuration management service 310), a single MID server may be used to manage both environments 302, 304. Additionally or alternatively, if the MID server 24A has access to the environment 304, the MID server 24B may be omitted.

Each discovered resource is identified as a configuration item with a record stored in the CMDB 108 including data indicating properties, attributes, dependencies, or other information about the resource. The CMDB 108 may be encoded, for example, as a relational database management system (RDBMS); an object-oriented database (e.g., an XML database); a network model database; or a flat-file database.

In a distributed network with multiple CIs, it may be difficult and/or time-consuming to continuously probe the network to discover the CIs or update the records of each CI in the CMDB 108. Accordingly, after an agent 312, 314 has begun executing on a respective CI in the environment 302, 304, the agent 312, 314 may automatically register an occurrence of the agent 312, 314 with the MID server 24A, 24B. The MID server 24A, 24B may then register the occurrence of the agent 312, 314 with the CMDB 108 (e.g., via the configuration management service 310). In this way, the MID server 24A, 24B and the CMDB 108 may maintain an accurate, up-to-date data store of active agents 312, 314 installed on resources 306, 308 in the environment 302, 304. Additionally, the MID server 24A, 24B may send a discovery request to each agent 312, 314 to obtain data associated with CIs in the environment 302, 304 and send the information to the CMDB 108, thereby maintaining an accurate, up-to-date data store of CIs in the environment 302, 304.

Figure 5:
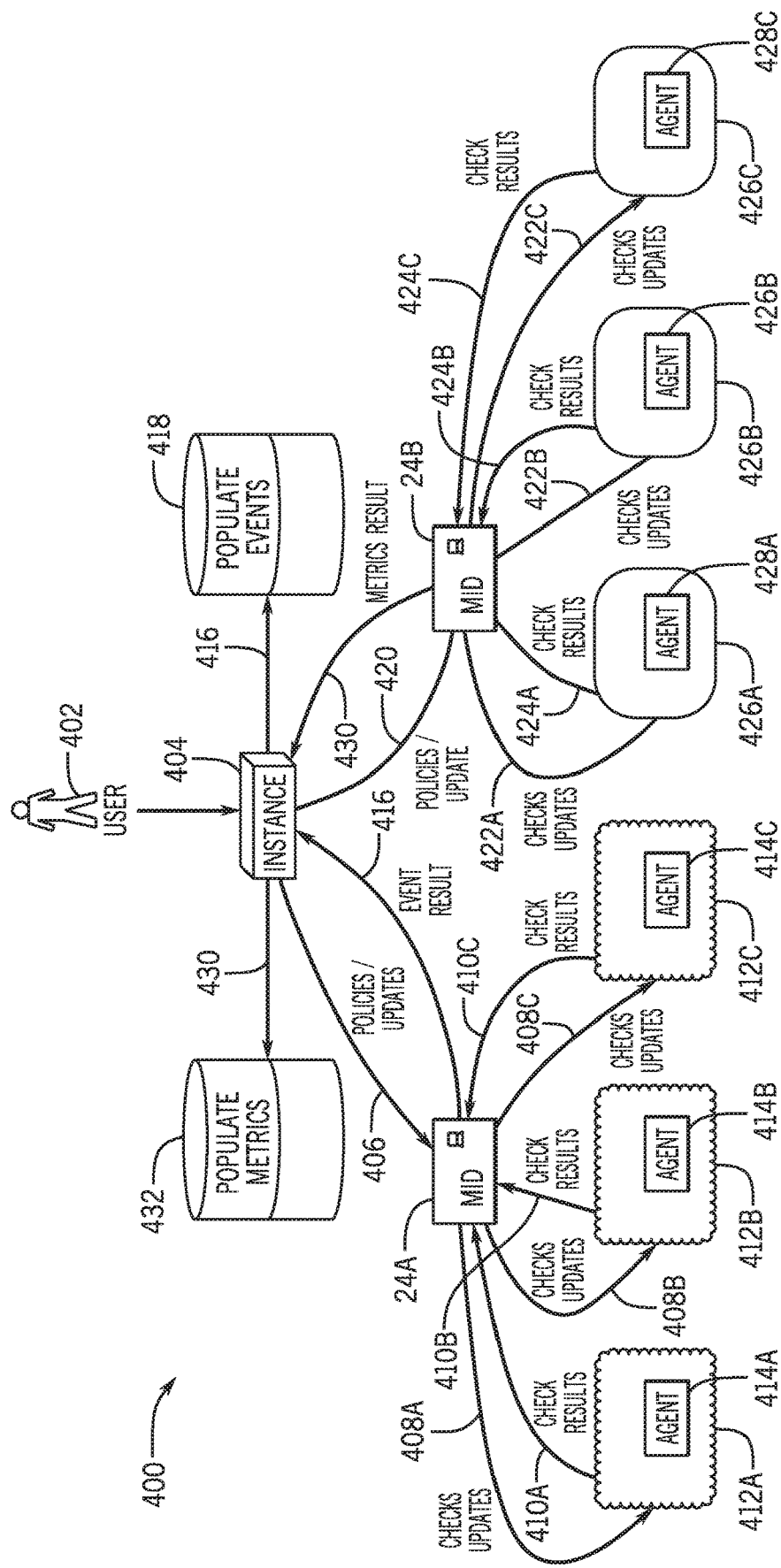
FIG. 5 is a flow architecture of a distributed computing system that may be present in the cloud architectures of FIG. 1 or 2, in accordance with aspects of the present disclosure.

The MID server 24 may act as an intermediary between an agent installed on a device and the CMDB 108 (e.g., via a configuration management service or a client instance). In an embodiment, the MID servers 24 may aggregate data received from one or more agents and send the aggregated data to the CMDB 108. For example, FIG. 5 illustrates a flow architecture 400 that may be used to share information (e.g., discovery payloads). In some embodiments, the flow architecture 400 may utilize methods disclosed in U.S. patent application Ser. No. 16/201,680, entitled "SYSTEMS AND METHODS FOR ENHANCED MONITORING OF A DISTRIBUTED COMPUTING SYSTEM," filed Nov. 27, 2018, which is incorporated herein in its entirety for all purposes.

Returning to FIG. 5, a user 402 may access an instance 404 (e.g., a client instance) to enter/modify/update policies 406 for monitoring and/or discovery. The policies 406 are then passed to the MID server 24A. The MID server 24A then sends corresponding checks/updates 408 to obtain check results 410 from respective resources 412 with corresponding agents 414. The respective resources 412 may include various devices, software, and/or networks. For example, the resources 412 may include cloud networks, cloud devices, host devices, a containerized application system, and the like. The MID server 24A then aggregates the check results 410 from the respective resources 412 into events results 416 that it transmits back to the instance 404. The events results 416 then stored in an appropriate events database 418. For instance, the events database 418 may include the CMDB 108 and/or another suitable database.

Other policies/updates 420 may be transmitted from the instance 404 to the MID server 24B that distributes checks updates 422 to obtain check results 424 from respective locations 426 each having respective agents 428. The MID server 24B then aggregates the check results 424 and derives metrics results 430. The MID server 24B transmits the check results 424 back to the instance 404 to be stored in a metrics database 432. In some embodiments, the metrics database 432 may include the same events database 418 used to store the events results 415. For instance, in some embodiments, the events results 416 and the metrics results 430 may be stored in the CMDB 108.

Figure 6:
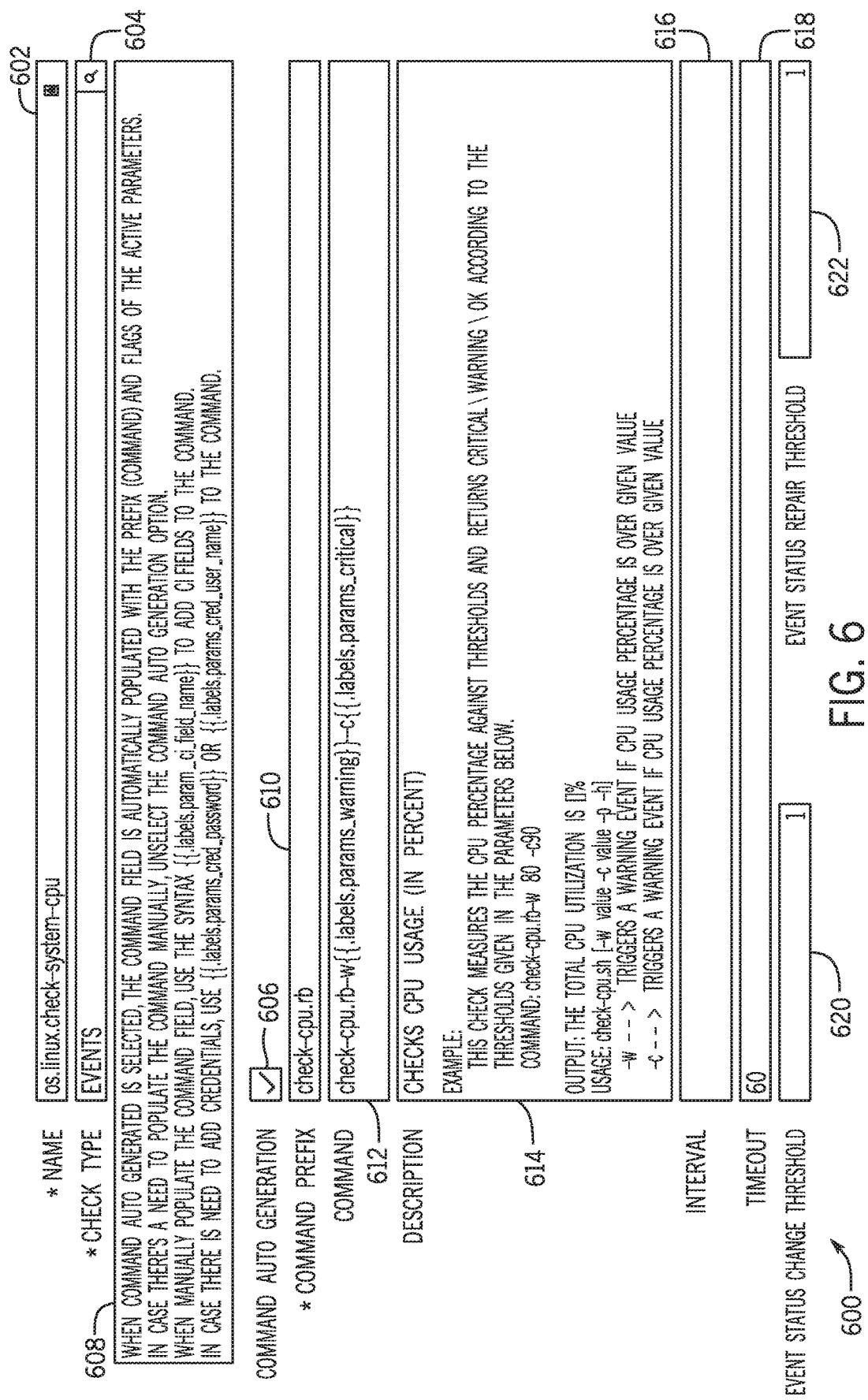
FIG. 6 is a user interface illustrating a check definition page that may be used in the flow architecture of FIG. 5, in accordance with aspects of the present disclosure.

Checks in the checks updates 422 may define commands and intervals at which times the commands are to be executed. As such, the check commands are executable commands that will be executed on the agent. The check commands may include arguments for controlling the behavior of the command. For instance, FIG. 6 illustrates a check definition page 600 that may be used by the user 402 may use to define a check. The check definition page 600 includes a name field 602 that may be used to name the check. A check type field 604 that defines a type for the check. For instance, the check type field 604 may indicate that the check is an event management type, a metric collection type, a discovery type, and/or any other suitable type. The check definition page 600 may also include a command auto-generation selector 606 along with explanation text 608. The command auto-generation selector 606 may be used to toggle a command auto-generation that may use a command prefix field 610 to populate a command field 612. The command auto-generation also populates that commands with active parameters. If the command field 612 is to be manually populated, the command auto-generation selector 606 may be deselected, and the command field 612 may be filled manually. The explanation text 608 may be used to instruct how to manually fill the command field 612.

The check definition page 600 may also include a description field 614 that may be used to include a human-readable description of the check. An interval field 616 may be used to set an interval for how frequently the command in the command field 612 is executed. A timeout field 618 may be used to define how long an interval is to lapse before the command times out. Since the event type is an event check type, related fields may be presented in the check definition page 600. An event status change threshold field 620 is used to indicate a threshold for an event status change, and an event status repair threshold field 622 is used to indicate a threshold for a repair due to the event status change. When other event types are selected, additional and/or other suitable fields may be presented in the check definition page 600.

Figure 7:
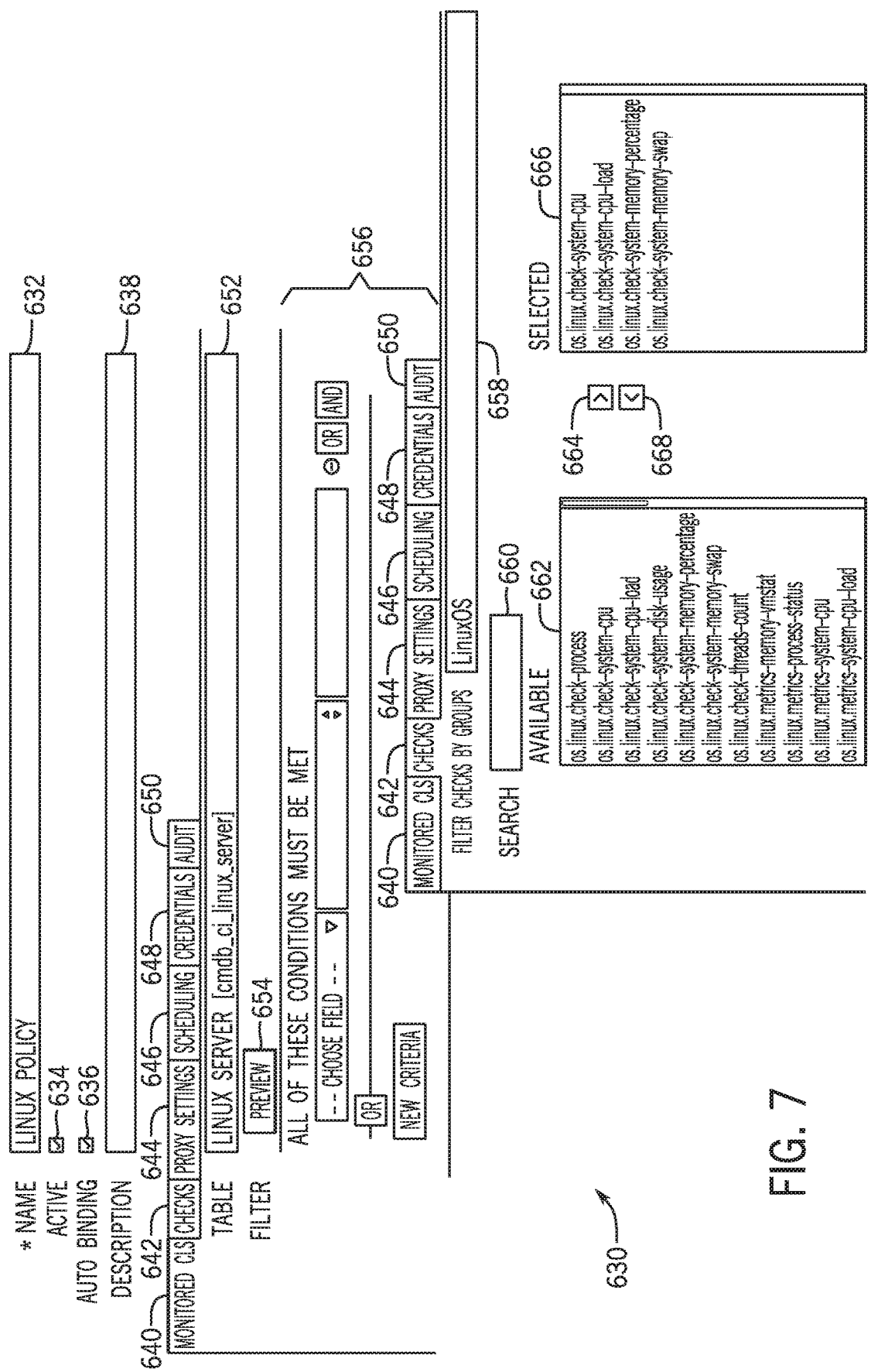
FIG. 7 is a user interface illustrating a policy definition page that may be used in the flow architecture of FIG. 5, in accordance with aspects of the present disclosure.
Figure 8:
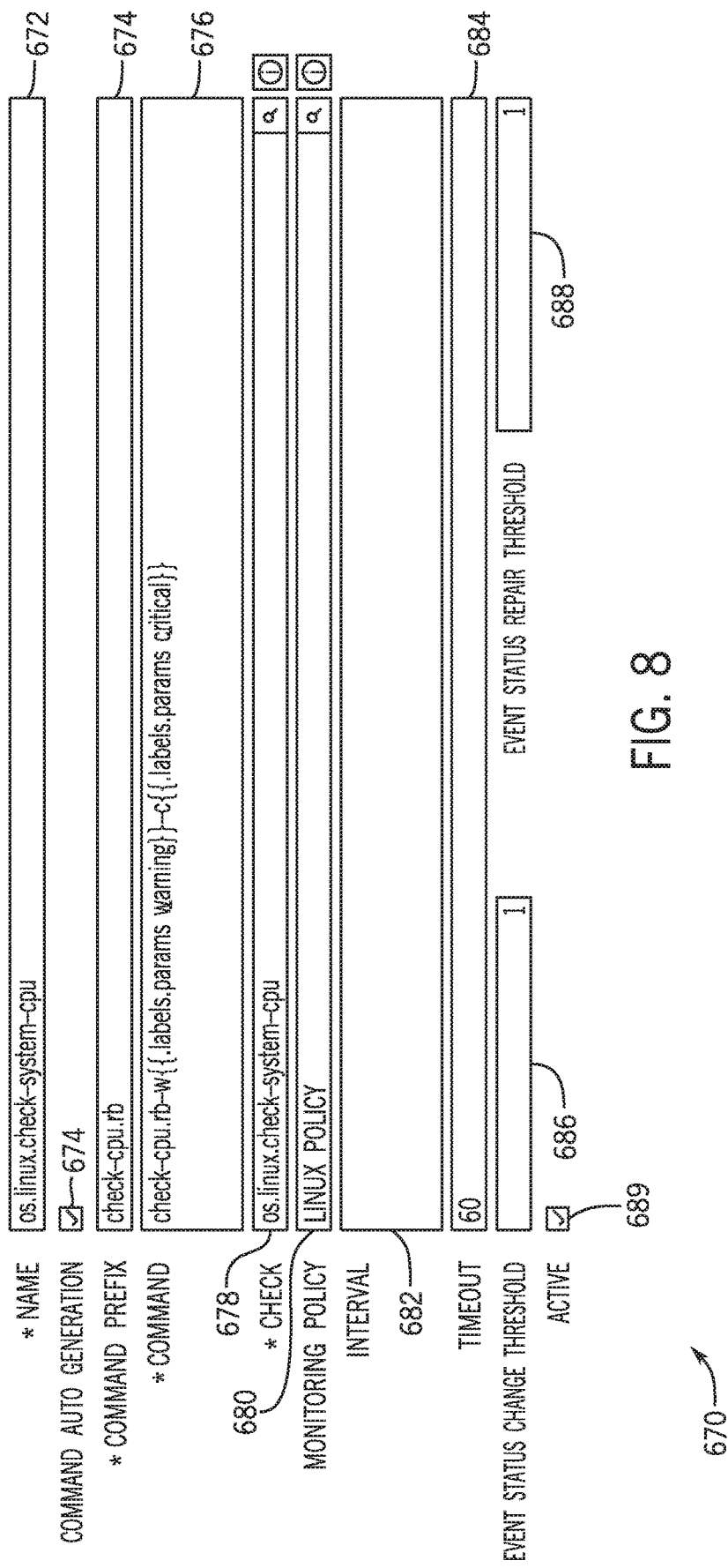
FIG. 8 is a user interface illustrating an instance check definition page that may be used in the flow architecture of FIG. 5, in accordance with aspects of the present disclosure.

A policy definition page 630, as illustrated in FIG. 7, may be used by the user 402 to define a policy. A policy may include a configuration of a set of checks combined with a set of CIs to run the check commands against. The policy definition page 630 includes a name field 632 that may be used to name a policy. An active selector 634 may be used to select whether the defined policy is active. An auto-binding selector 636 may be used to select whether the policy is automatically bound. A description field 638 may be used to provide a human-readable description of the policy. The policy definition page 630 may include a monitored CI tab 640, a checks tab 642, a proxy settings tab 644, a scheduling tab 646, a credentials tab 648, and an audit tab 650.

The monitored CI tab 640 may be used to select the CI population used. The monitored CI tab 640 may include a table field 652 that designates a table in the CMDB that stores CI entries used to select CIs to be monitored using the defined policy. The table may be filtered when a preview button 654 is selected based on filter parameters 656.

The checks tab 642 may be used to select check commands to be run. The check commands may include any checks defined (e.g., using the check definition page 600) and stored in a check definition library. Since a number of checks defined in a library may be large, the checks tab 642 may be used to filter the definition list. For instance, the checks tab 642 may include a group selector 658 used to select a group of checks. For instance, the group selector 658 may be used to select checks for corresponding operating systems. Within the group, the list may be further limited using a search field 660. The search field 660 is used to limit the list displayed in a selectable list 662. Any check selected in the selectable list 662 may be selected using an add button 664. Any selected and added check is indicated in a selected field 666 as added to the policy. The checks in the selected field 666 may be removed from the policy using a remove button 668.

The proxy settings tab 644 may be used to set proxy settings for the policy execution. The scheduling tab 646 may be used to set an appropriate interval of all of the checks in the policy. The credentials tab 648 may be used to indicate credentials to be used in executing the commands in the policy. An audit tab 650 may be used to audit various parameters about the policy and/or its checks.

After configuring the policy, each selected check definition may be duplicated and converted to a check instance associated with the policy. The user 402 may override the check instance configuration by changing the interval or the parameters for the check instance.

The override of the check instance may be performed using a check instance configuration page 670. The check instance configuration page 670 may include a name field 672 that is similar to the name field 602 but for the check instance. The check instance configuration page 670 also includes a command auto-generation selector 674 that functions similar to the command auto-generation selector 606 but for the check instance. The check instance configuration page 670 includes a command field 676 that is similar to the command field 612 but for the check instance. The check instance configuration page 670 includes a check field 678 that indicates a check from which the check instance was derived. The check instance configuration page 670 indicates a policy for the check instance. The check instance configuration page 670 includes an interval field 682 that is similar to the interval field 616 but for the check instance. The check instance configuration page 670 also includes a timeout field 684 that is similar to the timeout field 618 but for the check instance. The check instance configuration page 670 includes an event status change threshold field 686 and an event status repair threshold 688 that are respectively similar to the event status change threshold field 620 and the event status repair threshold field 622 but pertain the check instance rather than the repository version of the check. The check instance configuration page 670 also includes an active selector 689 used to select whether the check instance is active or inactive.

In some embodiments, the user 402 may access a representation of each installed agent that registered with the instance 404. For example, the user 402 may view all of the agents, the availability, their associated MID server 24, their associated CIs, and/or other information about the agents.

For instance, an agent page 690, illustrated in FIG. 9, may be presented to the user 402. The agent page 690 may present information about each agent. For instance, the agent page 690 may be used to present a name of each agent in a name column 692. The agent page 690 may also be used to present an IP address of each agent in an IP column 694. The agent page 690 may also be used to present a CI associated with each agent in a CI column 696. The agent page 690 may also be used to present a name of a MID server 24 associated with each agent in a MID column 698. The agent page 690 may also be used to present a status of each agent in a status column 700. The agent page 690 may also be used to present how long each agent has been active using an up since column 702. The agent page 690 may also be used to present when the last update has occurred for each agent in an update column 704.

Figure 10:
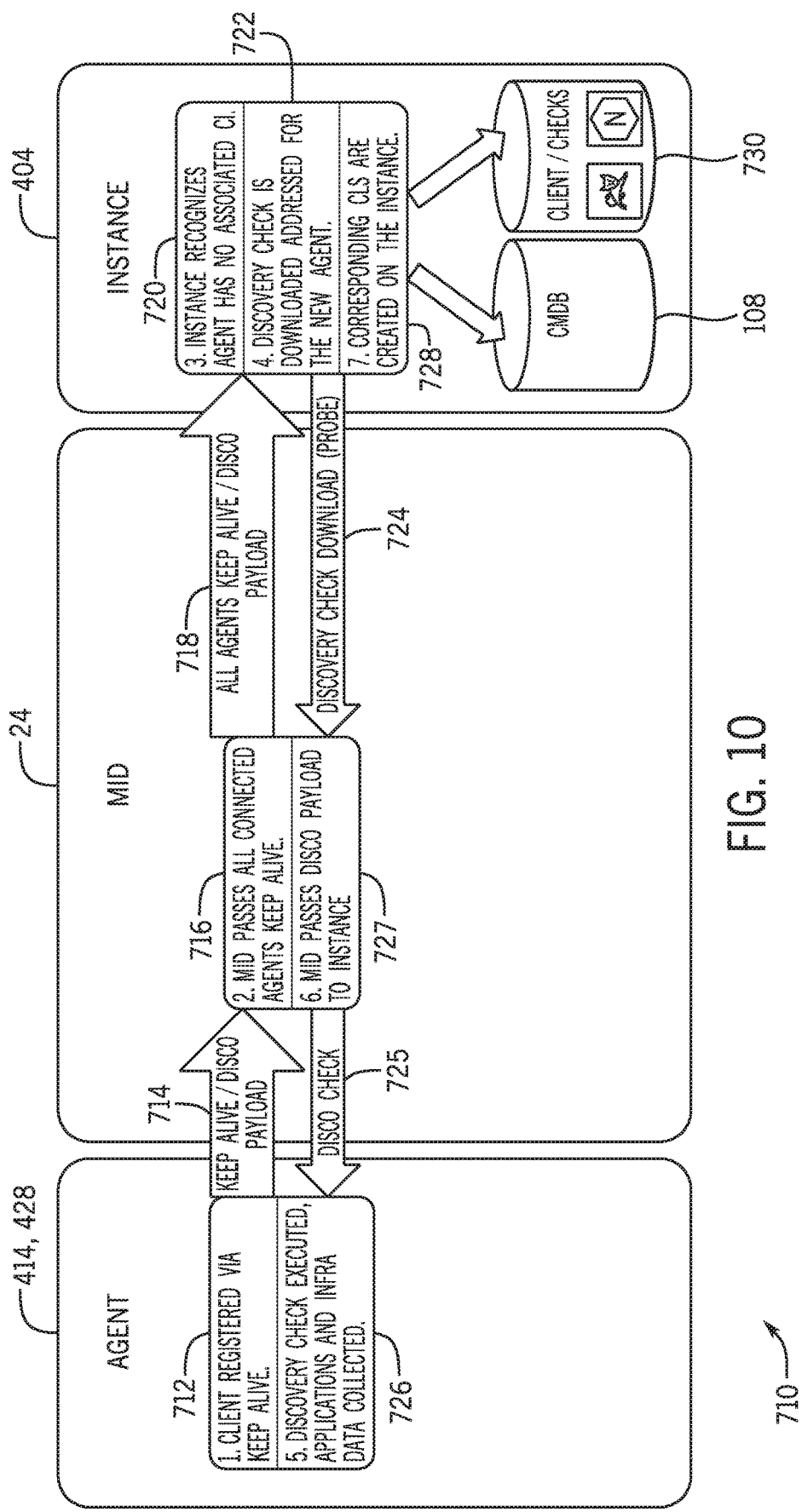
FIG. 10 is a discovery flow illustrating a discovery process that may be used in the flow architecture of FIG. 5, in accordance with aspects of the present disclosure.

After installing the agent package on a respective client, the agent is registered and discovered on the instance. A discovery flow 710 is illustrated in FIG. 10. After installation, the agent 414, 428 registers using a keep alive message (block 712). The keep alive message is sent over an agent-to-MID connection 714. The receiving MID server 24 passes keep alive messages from multiple connected agents to a respective instance 404 (block 716). The keep alive messages may be passed over a MID-to-instance connection 718. For instance, the keep alive messages may include a representational state transfer (REST) message sent via a HTTPs REST application programming interface (API) in the MID-to-instance connection 718.

Upon receiving the keep alive messages, the instance 404 recognizes that the corresponding agent has no associated CI entries (block 720). A discovery check is downloaded from a checks repository 730 that is addressed for the agent 414, 428 that has no associated CI (block 722). A discovery check (e.g., probe) is the downloaded to the MID server 24 via an instance-to-MID connection 724 that then passes the discovery check to the agents 414, 428 via a MID-to-agent connection 725. The agent 414, 428 executes the discovery check and collects information about the CI (block 726). The agent 414, 428 then passes the discovery payload up the agent-to-MID connection 714 and through the MID server 24 via the MID-to-instance connection 718. The corresponding CI entries are created on the instance 404 (block 728). The CI entries are then stored in the CMDB 108 from the instance 404.

Figure 11:
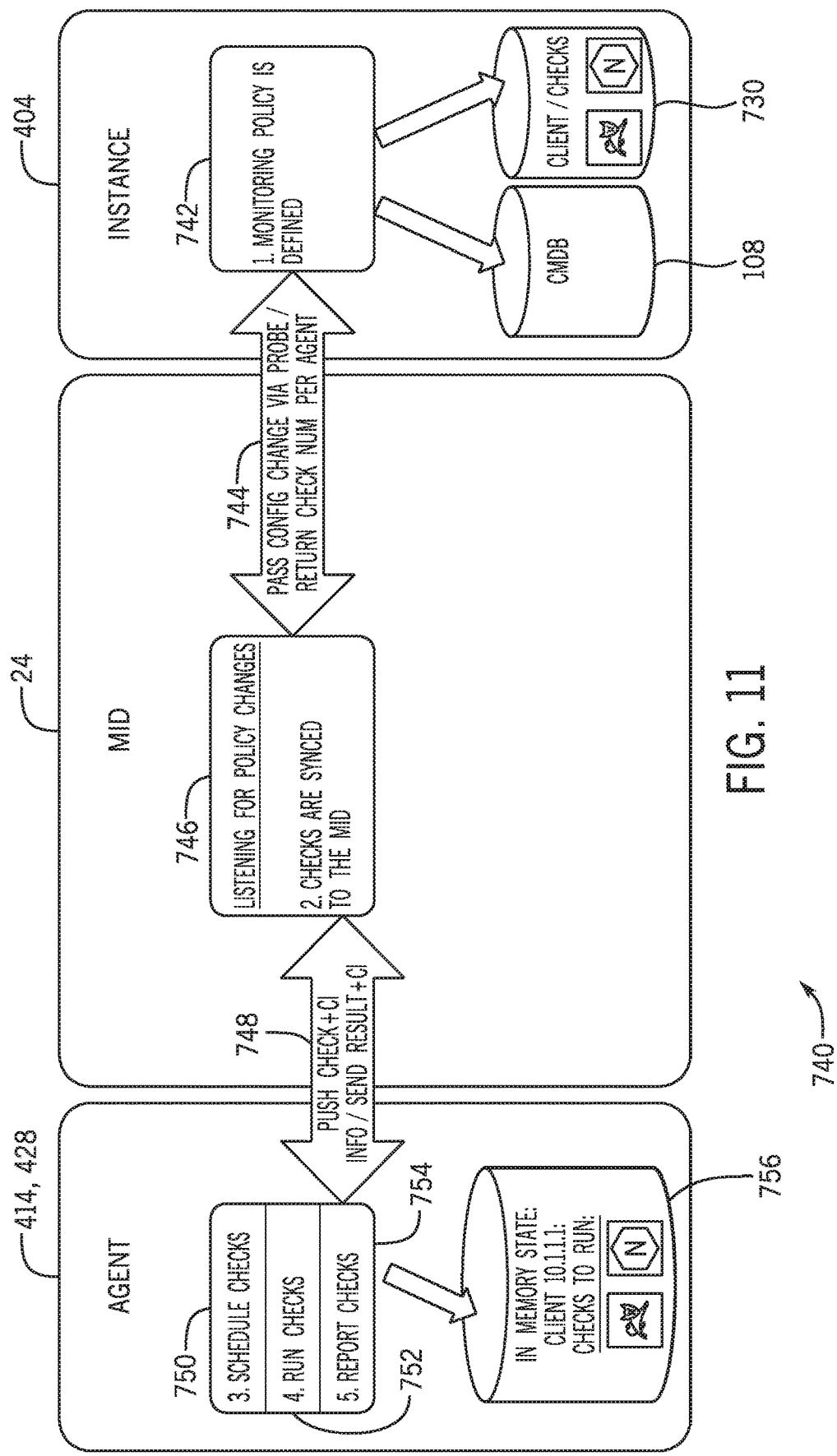
FIG. 11 is a configuration flow illustrating a configuration of a policy/check via an instance and reporting results back to the instance that may be used in the flow architecture of FIG. 5, in accordance with aspects of the present disclosure.

The agents 414, 428 may configured. For instance, FIG. 11 shows an example of a configuration flow 740. For example, a policy may be defined using the policy definition page 630 (block 742). The policy may be defined for various CI populations in the CMDB 108 and/or checks in the checks repository 730 with defined parameters (e.g., operating system, frequency, check types, etc.). The configuration changes are passed via MID-instance connection 744. The MID server 24 listens for policy changes and synchronizes the checks to the MID server 24 (block 746). In some embodiments, the listening is based on whether the policy changes are relevant to the CIs in the domain of the MID server 24. Furthermore, in some embodiments, policies, checks, and/or CI filters may be domain separated. The MID server 24 the pushes the relevant check to the agent 414, 428 via a MID-agent connection 748. Based on the configuration changes, the agent 414, 428 schedules checks (block 750), runs checks according to the schedule (block 752), and reports results back through the MID-agent connection 748. The agent 414, 428 may also store the checks and/or other information in a local memory 756. The results from the checks are passed back to the instance 404 and stored in the CMDB 108.

Figure 12:
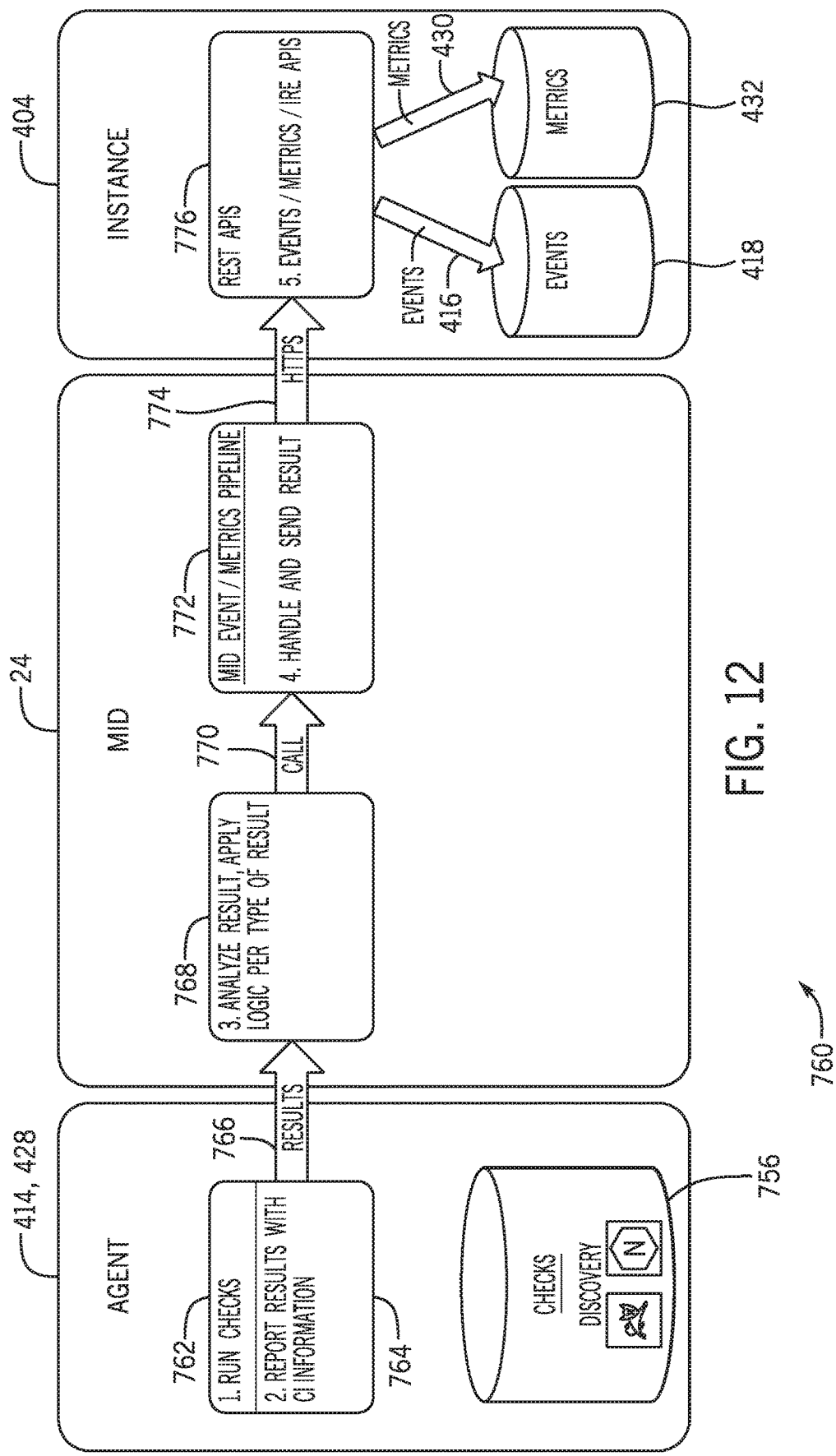
FIG. 12 is a data flow illustrating a flow of data in response to checks stored locally at the agent that may be used in the flow architecture of FIG. 5, in accordance with aspects of the present disclosure.

As previously noted, the agent 414, 428 may be used to track events and metrics. For instance, data may be transferred as illustrated in a data flow diagram 760 in FIG. 12. The agent 414, 428 runs checks stored in the local memory 756 (block 762). The agent 414, 428 reports results with CI information (block 764). The reported results from the checks are transmitted by the agent 414, 428 via a MID-agent connection 766. The MID server 24 receives the results, analyzes the results, and applies logic to a corresponding result type (e.g., metrics, events, or discovery payloads) (block 768). The MID server 24 routes the results using a call according to a type of result (block 770). The MID server 24 then handles the results and sends them to an appropriate location (block 772). For example, the MID server 24 may send the results to the instance 404 via a hypertext transfer protocol secure (HTTPs) connection or another connection type. The instance 404 then uses a pertinent architecture, such as a REST API, to route the results to proper locations (block 776).

To install the agent 414, 428, the user 402 may download the agent package (per OS) from the instance 404 and distribute it to its agents. Furthermore, the installation may include a one-line installation process to launch the agent process. After initial installation, the user 402 may configure basic settings such as MID server 24 IP, port, and credentials.

The agent scheme may include secure connections. For instance, connections between the MID server 24 and the agent 414, 428 may be authenticated using any suitable authentication methods. For instance, the authentication may include key-based authentication, certificate-based authentication, and/or the like. When a password is uses, the password may be written in clear text in an agent file (e.g., yml). After starting the agent service, the password may be encrypted.

To further increase security, the agent 414, 428 may redact parameters that may contain sensitive information from being printed to a log file. Instead of parameter value strings, a redacted string (e.g., "[REDACTED]") will be printed to the log file. The sensitive information may include a password, an api_key, an api_token, an access_key, a secret_key, a private_key, and/or other secrets. Furthermore, sensitive parameters may obfuscated by passing parameters to a process running a check through a standard stream (stdin) after running the command or define environment variables for the created process with the parameters and using their values in the check.

The agent 414, 428 may use plugins to enable a number of functions. For example, the plugins may be used to enable the following custom functions: a customer generates a public and private key, the customer uses the private key to sign the plugins and keeps it safe on its own machine, the customer uploads the public key to the relevant MIDs, the customer uploads its signed assets to the instance 404, and each MID server 24 validates the signature on the signed assets and passes the appropriate plugins to the agents. The agent 414, 428 may include the following out of the box (OOTB) plugins: generate private and public keys for the platform, use a private key for the platform to sign OOTB content, each MID server 24 validates the signature on the signed assets and passes the appropriate plugins to the agents, and the like.

To enable secure communications, the agent 414, 428 signs communications. The communications may be signed using a custom generated private key that may be validated using a public key. When using a platform public key, the public key may be provided by the user 402 and stored in the MID server 24. The public key may be provided from a key store, a machine store, or as a privacy enhanced mail (PEM) file in a certificate folder.

Validation may alternatively or additionally be performed in the agent 414, 428 using certificate validation. For example, such secured messages may secure against an impersonator MID server 24 who sends commands to the agents 414, 428. To perform such validation, each MID server 24 may distribute the public keys to the agent 414, 428 where the validation process will take place. Furthermore, time limiting may be used to revoke certificates after a private key has expired to require resigning with a new private key and supplying the new public key to the agent 414, 428.

Figure 13:
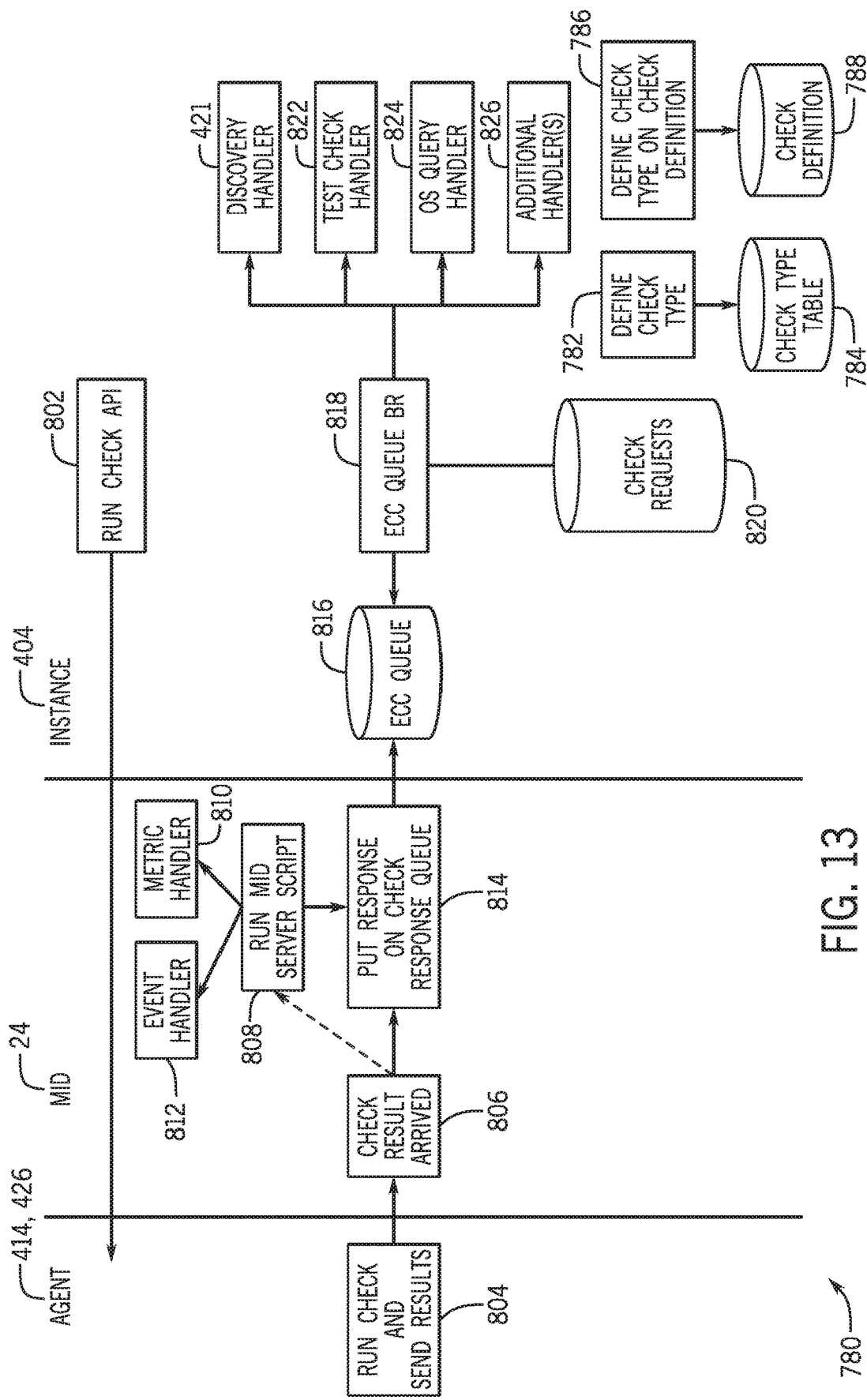
FIG. 13 is a data flow illustrating a flow of data in response to checks stored locally at the agent that may be used in the flow architecture of FIG. 5, in accordance with aspects of the present disclosure.

FIG. 13 illustrates a flow diagram 780 that utilizes a framework to handle various actions. As such, the user 402 may define how to process each check result. For example, the user 402 may be processed on the MID server 24 and/or on the instance 404. Furthermore, the framework may utilize a generic API to run ad hoc checks. Using the framework, the user 402 may view related check response results on the instance 404.

For instance, when data is to be obtained from a specific agent to be written to a table via the instance 404. The user 402 may create an instance or MID server script that processes the results and writes them to the table. A new check type may be associated with the script by defining the check type (block 782). In other words, the check type is mapped to an appropriate handler (e.g., MID server script and/or instance script) to process results. The check type definition is stored in a check type table 784. The check types may designate priorities and may designate whether the check is interactive or non-interactive. For instance, test checks and OS query checks may be interactive while discovery checks are non-interactive. In some embodiments, the MID server 24 may have different queues for aggregating results: an interactive queue and a non-interactive queue. Each of the queues may be limited in length by a property type. The interactive queue may be updated more frequently (e.g., 1 second) than a non-interactive queue update (e.g., 60 seconds) of the ECC queue 816.

The check request table 820 may include suitable fields, such as the type name field, a MID script field, an instance script field, and a field designating whether the check is interactive or non-interactive.

A new check definition of the new check type may also be created (block 786). The check definition defines a command and the interval at which the command is to be executed. As previously noted, check commands are executable commands which will be executed on the agent. The check definition is stored in a check definition table 788 with a reference to the relevant check type defined in the check type table 784.

A Run Checks API 802 may be invoked on the instance 404 to run the checks as a request. When invoking the Run Checks API 802, the request details are saved on in a check requests table 820. The check requests table 820 returns a request ID. Using the request ID, the user 402 and/or the instance 404 may poll the check requests table 820 to obtain updated information on the request. The check requests table 820 may include fields including a record for each ad hoc API call. The fields may also include a request ID that tracks the request, a CI query table name identifying a table to be queried, the query, check(s), a number of checks to be processed, a number of checks that have been processed, a status of the request, a timeout for the request, a priority for the request, and/or error messages for the request.

The MID server 24 receives the request from the instance 404 and transmits the request to the corresponding agent 414, 428. The agent 414, 428 runs the check(s) associated with the request and obtains results (block 804). The agent 414, 428 transmit the results to the MID server 24. The MID server 24 receives the results (block 806). The MID server 24 then determines if there is a script on the MID server 24. The script may include any suitable script format, such as Javascript code or the like. When there is a MID server 24 script related to the check output type, the MID server 24 runs the script (block 808). For instance, the user 402 may use the script to parse and modify the results in the MID server 24 before passing the modified results to the instance 404 using a generic API. The script may utilize various handlers, such as a metric handler 810 to hand metric results, an event handler 812 to handle event results, and/or other handlers to hand different type of results from the check request. When there is no script in the MID server 24 or when the script is a generic "send to instance" script, the MID server 24 transmits the results to the instance 404 (block 814). The instance 404 receives the results at an ECC queue 816. For instance, the results may be transmitted from the MID server 24 to the ECC queue 816 using a bulk by type transfer.

In some embodiments, when the MID server 24 completely handles the results, the corresponding entry in the check requests table 820 may be deleted. Additionally or alternatively, the entry in the check requests table 820 may be marked as completed rather than having the entry deleted.

On the instance 404 side, a rule 818 may be used to process each check result by invoking an associated handler on the instance-side in the platform. For example, the rule may invoke a discovery handler 821, a test check handler 822, an OS query handler 824, and/or other additional handler(s) 826. The rule 818 may also update the check requests table 820 when the results are passed to an appropriate handler. The appropriate handlers (including the metric handler 810 and event handler 812) may route the results through corresponding pipelines for handling the results. The rule 818 may be defined for the ECC queue 816 when the check type and check definitions are defined.

Although in some embodiments the handlers 810, 812, 821, 822, 824, and 826 may handle results from a single check command, in some embodiments, a single policy may include checks that invoke multiple handler types for a single policy. Additionally or alternatively, each policy and/or check may involve results that are handled by more than one handler. For instance, a first portion of the results may be passed to a first handler while a second portion of the results may be passed to a second handler. Alternatively, the entire results may be passed to multiple handlers.

In some embodiments, when the results are handled completely by the MID server 24, the results may not be passed to the ECC queue 816 via a generic pipeline. Instead, the results may be routed through appropriate pipelines. For instance, the metric handler 810 may route results through a metric pipeline while the event handler 812 may route results through an event pipeline.

The disclosed techniques enable a user to better maintain and manage a dynamic network of components. Specifically, the disclosed techniques enable a user to perform checks (e.g., discovery, metrics, or event management) on various configuration items (CIs) (e.g., devices, applications, containers, microservices, or ephemeral entities) on devices employed within a distributed system that may often be subject to change. The disclosed techniques provide a multipartite paradigm that may provide an efficient and scalable monitoring framework that facilitates discovery, event management, and metrics collection with multiple CIs in the distributed system. The data shared between an agent, a MID server, and a configuration management service within the multipartite paradigm may enable the components to operate more efficiently and generally provide for improved monitoring of the distributed system infrastructure. For example, the multipartite paradigm may provide a user with real-time (or substantially real-time) data associated with a CI in response to a query of the CI by the user via the configuration management service. Additionally, the registration of an occurrence of the agent with the MID server and/or the configuration management service may minimize the need to bind a CI to data produced as a result of a check performed by the agent on the CI.

The specific embodiments described above have been shown by way of example and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
a managerial server communicatively coupled to an instance hosted by a cloud service platform and an agent, wherein the managerial server is configured to:
receive an indication of a status of the agent;
transport the indication to the instance;
receive a discovery check from the instance;
transmit the discovery check to the agent to cause the agent to run discovery against a device on which the agent is installed, wherein the discovery comprises identifying configuration item information associated with the device;
receive the configuration item information of the discovery from the agent; and
transmit the configuration item information to the instance to be stored in the instance.

2. The system of claim 1, wherein the indication of the status comprises a keep alive indication received at the managerial server from the agent.

3. The system of claim 1, wherein receiving the discovery check from the instance comprises an indication that no configuration item (CI) entries are stored in the instance.

4. The system of claim 1, wherein receiving the discovery check from the instance comprises an indication that no configuration item (CI) entries in a configuration management database (CMDB) of the instance are associated with the agent.

5. The system of claim 4, wherein transmitting the configuration item information to the instance to be stored comprises storing the configuration item information as a CI entry associated with the agent in the CMDB.

6. The system of claim 1, wherein receiving the discovery check comprises receiving the discovery check from a check database of the instance.

7. The system of claim 1, wherein the discovery check comprises a discovery probe to be executed against the device.

8. The system of claim 1, wherein the managerial server is configured to:
cause the agent to perform one or more check requests;
receive results from the one or more check requests; and
transmit the one or more check requests.

9. The system of claim 8, wherein the one or more check requests comprise a discovery process, metrics collection, event management, or a combination thereof.

10. The system of claim 8, wherein causing the agent to perform the one or more check requests comprises receiving the one or more check requests from the instance.

11. The system of claim 8, wherein receiving the one or more check requests comprises receiving the one or more check requests in a policy defined in the instance.

12. The system of claim 8, wherein causing the agent to perform the one or more check requests comprises causing the agent to locally store the one or more check requests with an interval indicating how frequently the agent is to perform the one or more check requests.

13. The system of claim 1, wherein the managerial server and the agent are installed on the device.

14. A system comprising:
an intermediary server communicatively coupled to an instance hosted by a cloud service platform and an agent, wherein the intermediary server is configured to:
receive a first result from a first check executed by the agent having a first check type;
transmit the first result to the instance using a connection type generic to a plurality of check types including the first check type;
receive a second result from a second check executed by the agent having a second check type;
select a dedicated pipeline based on the second check type; and
transmit the second result using the dedicated pipeline for the second check type.

15. The system of claim 14, wherein the first check type comprises discovery checks, operating system queries, ad hoc queries, generic tests, or a combination thereof.

16. The system of claim 14, wherein the second check type comprises event checks or metric checks.

17. The system of claim 14, wherein the intermediary server is configured to:
receive a third result from a third check executed by the agent having a third check type; and
transmit the first result to the instance using the connection type generic to the plurality of check types.

18. The system of claim 14, wherein the intermediary server is coupled to a plurality of agents including the agent, wherein the intermediary server is configured to:
aggregate results from the plurality of agents; and
sort and deliver check requests to respective agents of the plurality of agents.

19. The system of claim 14, wherein the intermediary server is configured to:
determine that a script located on the intermediary server is to be run on the second result; and run the script on the second result before transmitting the second result using the dedicated pipeline.

20. A method, comprising:

receiving a plurality of checks at a measurement, instrumentation, and discovery (MID) server from a cloud platform instance;

routing respective checks of the plurality of checks from the cloud platform instance to respective agents of a plurality of agents communicatively coupled to the MID server;

receiving results from the plurality of checks;

identifying respective dedicated pipelines, each respective dedicated pipeline associated with a respective check type;

processing a first portion of the results in the MID server and passing the processed first portion of the results up the respective dedicated pipelines; and transmitting a second portion of the results to the cloud platform instance via a queue to the cloud platform instance that is generic to a plurality of check types.

* * * * *